United States Patent
Zhang et al.

(10) Patent No.: US 11,734,364 B2
(45) Date of Patent: *Aug. 22, 2023

(54) METHOD AND SYSTEM FOR DOCUMENT SIMILARITY ANALYSIS

(71) Applicant: OPEN TEXT CORPORATION, Waterlo (CA)

(72) Inventors: Lei Zhang, Shanghai (CN); Chao Chen, Shanghai (CN); Kun Zhao, Shanghai (CN); Jingjing Liu, Shanghai (CN); Ying Teng, Pleasanton, CA (US)

(73) Assignee: Open Text Corporation, Waterloo (CA)

( * ) Notice: Subject to any disclaimer, the term of this patent is extended or adjusted under 35 U.S.C. 154(b) by 6 days.

This patent is subject to a terminal disclaimer.

(21) Appl. No.: 16/791,628

(22) Filed: Feb. 14, 2020

(65) Prior Publication Data

US 2020/0183986 A1    Jun. 11, 2020

Related U.S. Application Data

(63) Continuation of application No. 14/968,421, filed on Dec. 14, 2015, now Pat. No. 10,572,544.

(51) Int. Cl.
*G06F 16/93* (2019.01)
*G06F 16/22* (2019.01)
*G06F 16/2455* (2019.01)
*G06F 16/2457* (2019.01)

(52) U.S. Cl.
CPC .......... *G06F 16/93* (2019.01); *G06F 16/2246* (2019.01); *G06F 16/2455* (2019.01); *G06F 16/24578* (2019.01)

(58) Field of Classification Search
None
See application file for complete search history.

(56) References Cited

U.S. PATENT DOCUMENTS

| | | |
|---|---|---|
| 8,661,023 B1 | 2/2014 | Chun et al. |
| 10,572,544 B1 | 2/2020 | Zhang et al. |
| 2010/0082333 A1 | 4/2010 | Al-Shammari |
| 2011/0035656 A1 | 2/2011 | King et al. |
| 2011/0087669 A1 | 4/2011 | Ancin et al. |
| 2011/0264672 A1* | 10/2011 | Gipp ............... G06F 16/382 707/749 |

(Continued)

OTHER PUBLICATIONS

Office Action issued for U.S. Appl. No. 14/968,421, dated Oct. 30, 2018, 21 pages.

(Continued)

*Primary Examiner* — Dawaune A Conyers
(74) *Attorney, Agent, or Firm* — Sprinkle IP Law Group

(57) ABSTRACT

A method for document similarity analysis. The method includes generating a reference document content identifier for a reference document, including identifying frequently occurring terms in reference document content, encoding each frequently occurring term in a term identifier and combining the term identifiers to form the reference document content identifier associated with the reference document. The method also includes obtaining at least one document similarity value by comparing the reference document content identifier to a set of archived document content identifiers stored in a document repository.

19 Claims, 10 Drawing Sheets

(56) References Cited

U.S. PATENT DOCUMENTS

| | | | | |
|---|---|---|---|---|
| 2012/0271813 A1* | 10/2012 | Shen | ................. | G06F 16/951 |
| | | | | 707/711 |
| 2014/0222870 A1 | 8/2014 | Zhang | | |
| 2016/0275347 A1 | 9/2016 | Sukhodolov | | |
| 2016/0283472 A1* | 9/2016 | Yamaoka | ............. | G06F 40/194 |
| 2016/0378796 A1* | 12/2016 | Hopcroft | ............. | G06F 16/316 |
| | | | | 707/692 |

OTHER PUBLICATIONS

Office Action issued for U.S. Appl. No. 14/968,421, dated May 14, 2019, 10 pages.
Notice of Allowance issued for U.S. Appl. No. 14/968,421, dated Oct. 15, 2019, 8 pages.

* cited by examiner

Bit Array Entries 0...$2^{N-1}$

METHOD AND SYSTEM FOR DOCUMENT SIMILARITY ANALYSIS

CROSS-REFERENCE TO RELATED APPLICATIONS

This application is a continuation of, and claims a benefit of priority under 35 U.S.C. 120 of the filing date of U.S. patent application Ser. No. 14/968,421, filed Dec. 14, 2015, entitled "METHOD AND SYSTEM FOR DOCUMENT SIMILARITY ANALYSIS," now U.S. Pat. No. 10,572,544, the entire contents of which are hereby expressly incorporated by reference for all purposes.

BACKGROUND

A significant number of electronic documents are stored by companies in their document repositories. Given the number of documents that are stored, it is difficult to easily locate documents based on similarity with a reference document.

DETAILED DESCRIPTION

Figure 1:
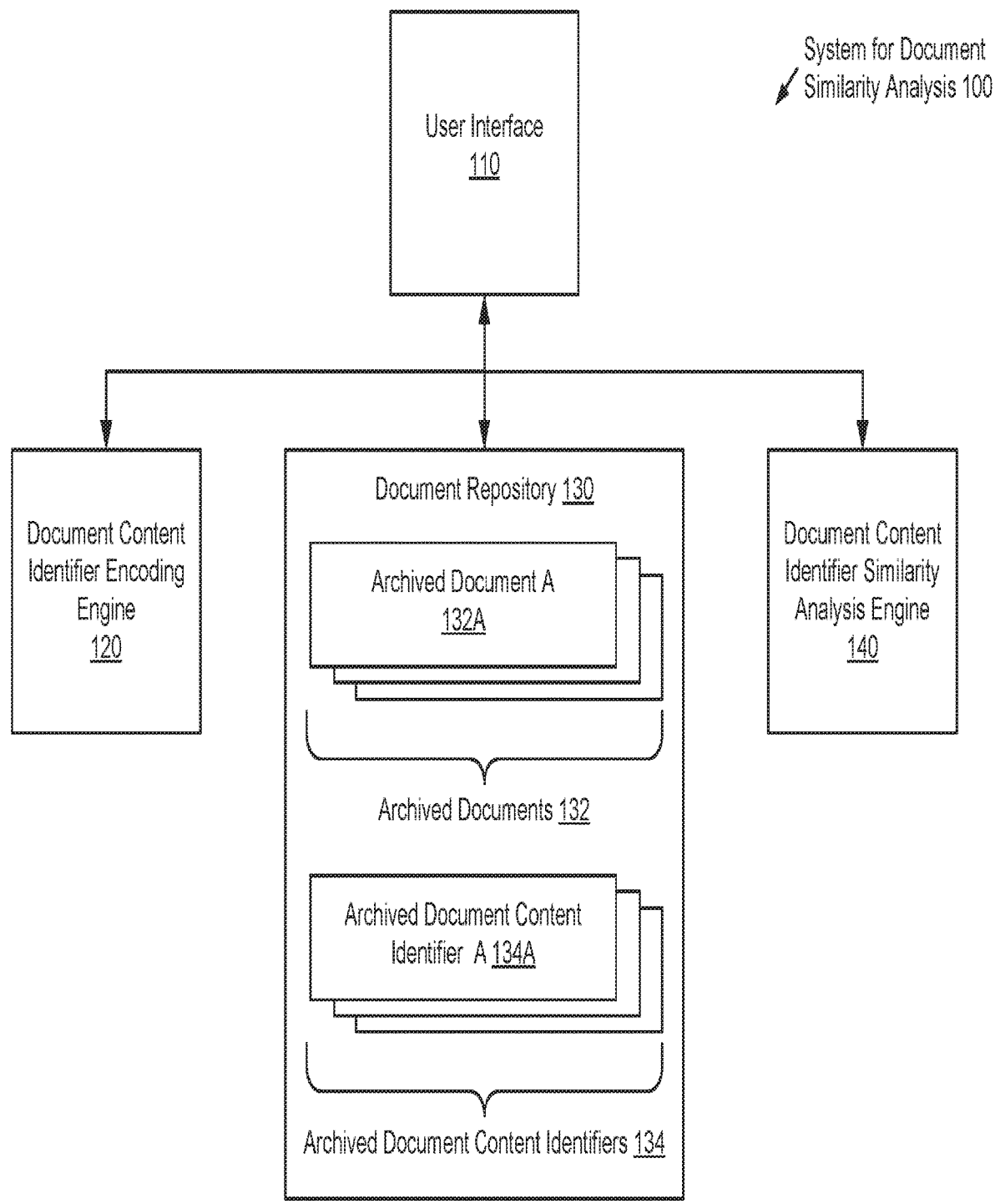
FIG. 1 shows a system, in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology are directed to methods and systems for assessing document content similarity and for identifying documents that contain at least a certain degree of similar content. More specifically, in one or more embodiments of the technology, the content analyzed for similarities is text. Content of a reference document may be compared to content of multiple other documents, for example, content located in archived documents. The methods may be employed, for example, where a large volume of archived documents may need to be reviewed for similarity to a reference document.

In one or more embodiments of the technology, the similarity analysis is performed by identifying frequently occurring terms in a reference document, by generating a document content identifier from the frequently occurring terms, and by comparing the document content identifier to document content identifiers obtained for other documents. The similarity analysis is described below, with reference to FIGS. 3-7E.

FIG. 1 shows a schematic diagram of a system in accordance with one or more embodiments of the technology. Specifically, FIG. 1 shows a system for document similarity analysis (100) enabling users of the system to analyze documents for similarity with a reference document. The system may include a user interface (110), a document content identifier encoding engine (120), a document repository (130) and a document content identifier similarity analysis engine (140). Each of these components is described in detail below.

In one or more embodiments of the technology, a user may access the user interface (110) in order to identify, in a set of documents, documents that include content similar to the content of a reference document. Accordingly, the user interface may enable the user to specify the reference document. The reference document may be specified by the user, for example, by uploading the reference document, or by selecting the reference document from a set of documents that are accessible via the user interface. The user interface (110) may further be used to present the results of the document identification (i.e., the identified documents) to the user. The identified documents may be presented to the user, for example, in the form of a document list. Further, the degree of similarity may be reported to the user via the user interface. The identified documents may be reported to the user, in the order of similarity, e.g., a document with the highest degree of similarity to the reference document may be reported first. The user interface may in addition be used to configure the document identification. For example, the user interface may enable the user to specify a document repository from where documents to be analyzed for similarities may be obtained, it may enable the user to parameterize the document content identifier engine and/or the document content identifier similarity analysis engine (as further discussed below), etc.

Figure 8:
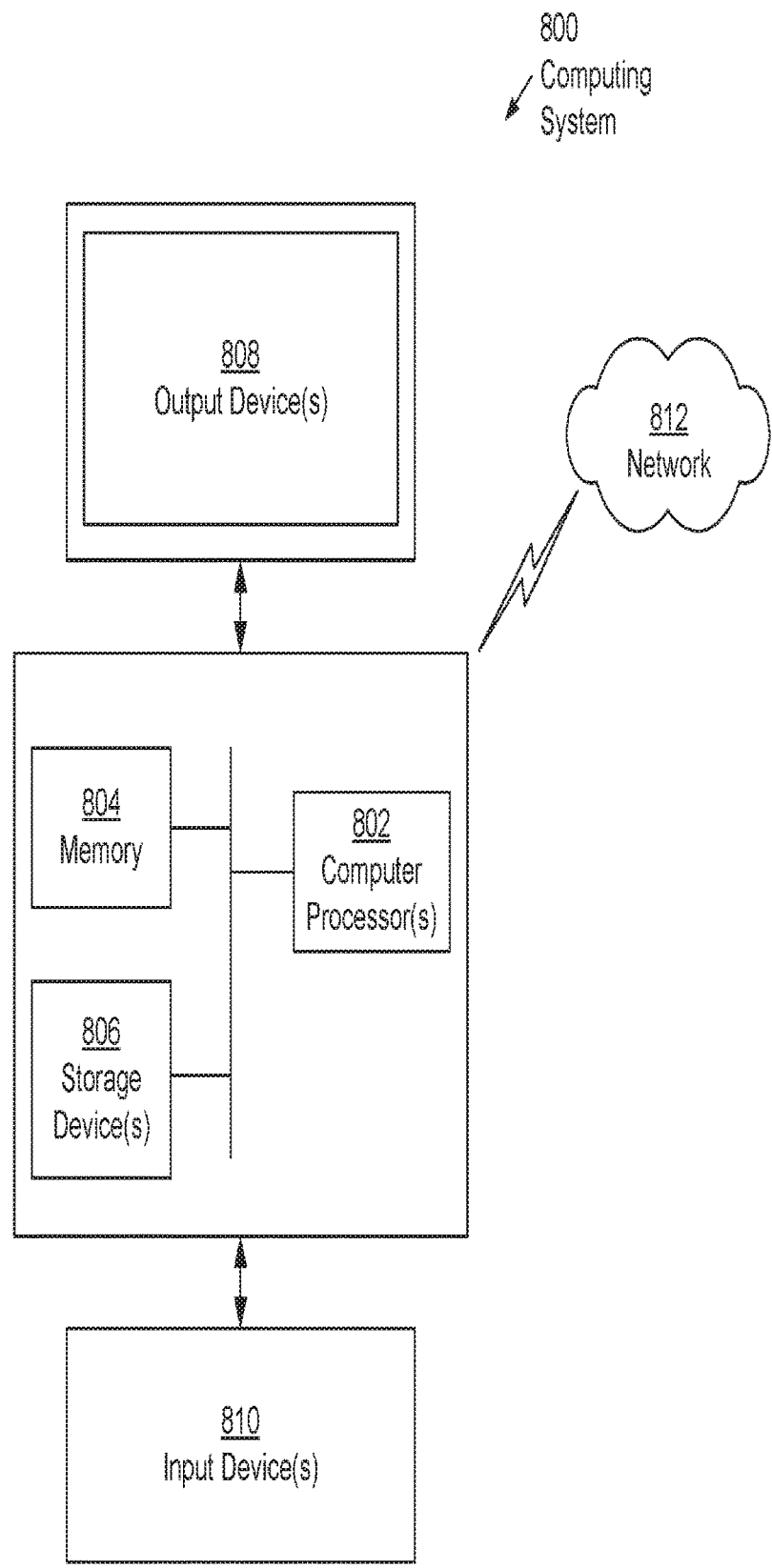
FIG. 8 shows a computing system in accordance with one or more embodiments of the technology.

The user interface, in accordance with one or more embodiments of the technology, may be executing on a computing device similar to the exemplary computing device shown in FIG. 8. In one or more embodiments of the technology, the user interface may interface with the document content identifier encoding engine (120), the document repository (130) and the document content identifier similarity analysis engine (140).

Continuing with the discussion of FIG. 1, the system (100) further includes the document content identifier encoding engine (120). In one or more embodiments of the technology, the document content identifier encoding engine executes software instructions in the form of non-transitory computer readable program code described in detail below, with reference to FIGS. 3-5. The instructions may enable the document content identifier encoding engine (120) to convert a reference document and/or one or more archived documents into a form that allows for quantitative assessment of document similarity. The instructions may, for example, include functionality to tokenize text content, to identify frequently occurring terms and to encode the frequently occurring terms in term identifiers which may subsequently combined to form a document content identifier, as further described below, with reference to FIG. 5. The document content identifier encoding engine (120) may execute on a computing device that may be similar to the exemplary computing device shown in FIG. 8, and may be any type of mobile, desktop, server, embedded, or other hardware capable of performing at least one of the steps described below with reference to FIGS. 3-5.

Continuing with the discussion of FIG. 1, in one or more embodiments of the technology, the system (100) includes a document repository (130). The document repository may store archived documents (132). In addition, the document repository may store archived document content identifiers (134), corresponding to the archived documents (132). The document repository may be any type of document storage suitable for storing at least one archived document. The document repository may be, for example, an enterprise content management system, a database, a folder or a group of folders on a storage device. The archived document repository may be local, i.e., it may be located on the computing device on which the user interface is executing, or it may be remote, e.g., located on a physical server. Further, a single document repository (130) may be used to store the archived documents (132) and the corresponding archived document content identifiers, or separate repositories may be used to store the archived documents and the corresponding archived document content identifiers. The document repository may be stored on any type of non-volatile storage, including, for example, a hard disk drive, a redundant array of independent disks (RAID), network attached storage (NAS), cloud storage, etc. Further, at least some of the content of the document repository may alternatively or additionally be stored in volatile memory, e.g., in RAM.

Archived documents (132) may be stored in any file format suitable for the storage of text. These file formats may include, for example, plain text files (.txt), Microsoft® Word files (.doc, .docx), Adobe® Acrobat files (.pdf), etc. Those skilled in the art will appreciate that the technology is not limited to the aforementioned protocols. Rather, any file that may contain text, either exclusively, or in combination with non-text content (e.g. CAD files), regardless of the file format, may be processed.

Archived document content identifiers (134) may be stored in any format suitable for storage of a document content identifier of a chosen format. In one embodiment of the technology, the archived document content identifier is based on a bit array representation, as further described in FIG. 2A. An archived document content identifier, in accordance with an embodiment of the technology, is stored in the document repository (130) using a binary search tree representation, further described below, with reference to FIG. 2B. The document repository (130) may thus include a binary search tree, built from the archived document content identifiers (134). Those skilled in the art will recognize that other representations may alternatively be used to store the archived document content identifiers (134) in the document repository (130).

In one or more embodiments of the technology, the system (100) further includes the document content identifier similarity analysis engine (140). The document content identifier similarity analysis engine may execute software instructions in the form of non-transitory computer readable program code described in detail below, with reference to FIGS. 4 and 6. The instructions may enable the document content identifier similarity analysis engine (140) to assess the similarity of a reference document and an archived document, based on the similarity between the reference document identifier associated with the reference document and the archived document content identifier associated with the archived document. The document content identifier similarity analysis engine (140) may execute on a computing device that may be similar to the exemplary computing device shown in FIG. 8, and may be any type of mobile, desktop, server, embedded, or other hardware capable of performing at least one of the steps described below with reference to FIG. 6. The document similarity analysis engine may be executing on a computing device that is also executing the document content identifier encoding engine, or it may be executing on a separate computing device.

One skilled in the art will recognize that the architecture of the system is not limited to the components shown in FIG. 1. For example, the components of the system may be collocated on a single computing device, or they may be distributed in various ways. One or more of the components may be located on a server, in a data center, in the cloud, etc. The components may be provided by a single entity, or by multiple entities.

If components of the system are distributed, the components may be connected via a network (e.g., a local area network (LAN), a wide area network (WAN) such as the Internet, mobile network, or any other type of network) enabling the components, including the user interface, the document repository, the document content identifier encoding engine and/or the document content identifier similarity analysis engine, to communicate. The network may implement any combination of wired and/or wireless communication protocols. The communication between the components of the system (100) may include any combination of secured (e.g., encrypted) and non-secured (e.g., un-encrypted) communication. The manner in which the components of the system communicate may vary based on the implementation of the technology.

Figure 2A:
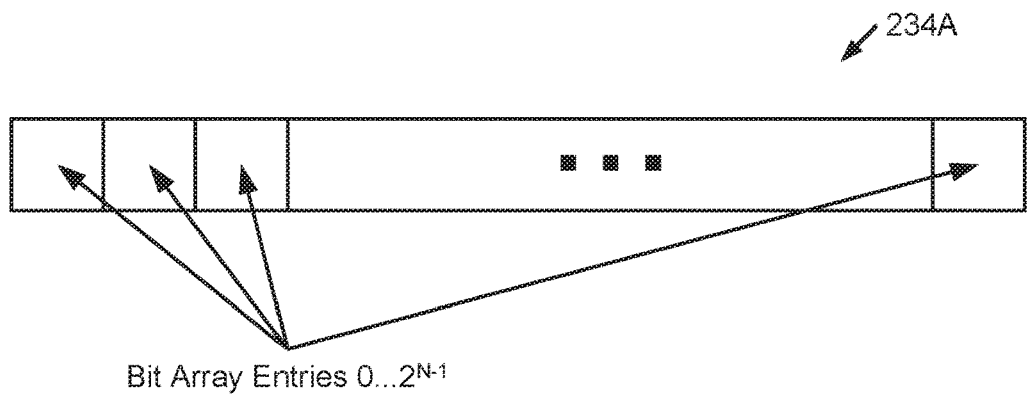
FIGS. 2A and 2B show data representations, in accordance with one or more embodiments of the technology.

FIG. 2A shows a data representation, in accordance with one or more embodiments of the technology. The data representation shown in FIG. 2A may be used to represent an archived document content identifier (234A) and/or a reference document content identifier. A document content identifier may be constructed from document content to be compared, as described in detail below with reference to FIG. 5. Accordingly, a reference document content identifier may be constructed from the reference document content, and an archived document content identifier may be constructed from the archived document content. More specifically, a document content identifier may be constructed from a set of frequently occurring terms, obtained from the document content. Each frequently occurring term may be encoded such that it is represented by a number. The group of encoded term identifiers, obtained from the document content, in accordance with an embodiment of the technology, forms the document content identifier. Various methods for identifying frequently occurring terms and for mapping a frequently occurring term to a term identifier may be used. These methods are described below with reference to FIG. 5.

A document content identifier may be based on a bit array representation as shown in FIG. 2A. The document content identifier may include a number of bit array entries. Each of the bit array entries may be set to either "0" or "1". Initially, the entire document content identifier may be initialized to "0", i.e., all bit array entries may be set to "0". Subsequently, the newly initialized document content identifier may be populated with the encoded frequently occurring terms. The encoding of a frequently occurring term may be chosen to map the frequently occurring term to a number in a specified range. For example, if the encoding is based on 32-bit integer variables (N=32), and only positive integers are used, the specified range may include numbers ranging from 0 to $2^{31}$ (0 . . . 2,147,483,648).

An encoded frequently occurring term may then be included in the bit array of the document content identifier by making an entry in the bit array, at the location corresponding to the number representing the encoded frequently occurring term.

Consider, for example, a scenario where three encoded frequently occurring terms are to be entered in the bit array of the document content identifier. Assume that the first encoded frequently occurring term is "4", that the second encoded frequently occurring term is "3", and that the third encoded frequently occurring term is "15". In the bit array of the document content identifier, bit array entries 3, 4, and 15 are therefore set to "1", whereas all other bit array entries remain set to "0". The size of the bit array, in accordance with one or more embodiments of the technology, is chosen to match the numerical range used for encoding frequently occurring terms. For example, if the encoding of frequently occurring terms is based on numbers ranging from 0 to $2^{31}$ (0 . . . 2,147,483,648), the document content identifier includes bit array entries 0 . . . 2,147,483,648.

A simplified example, illustrating the generation and the use of document content identifier is provided as part of the use case, described below with reference to FIGS. 7A-7E.

Figure 2B:
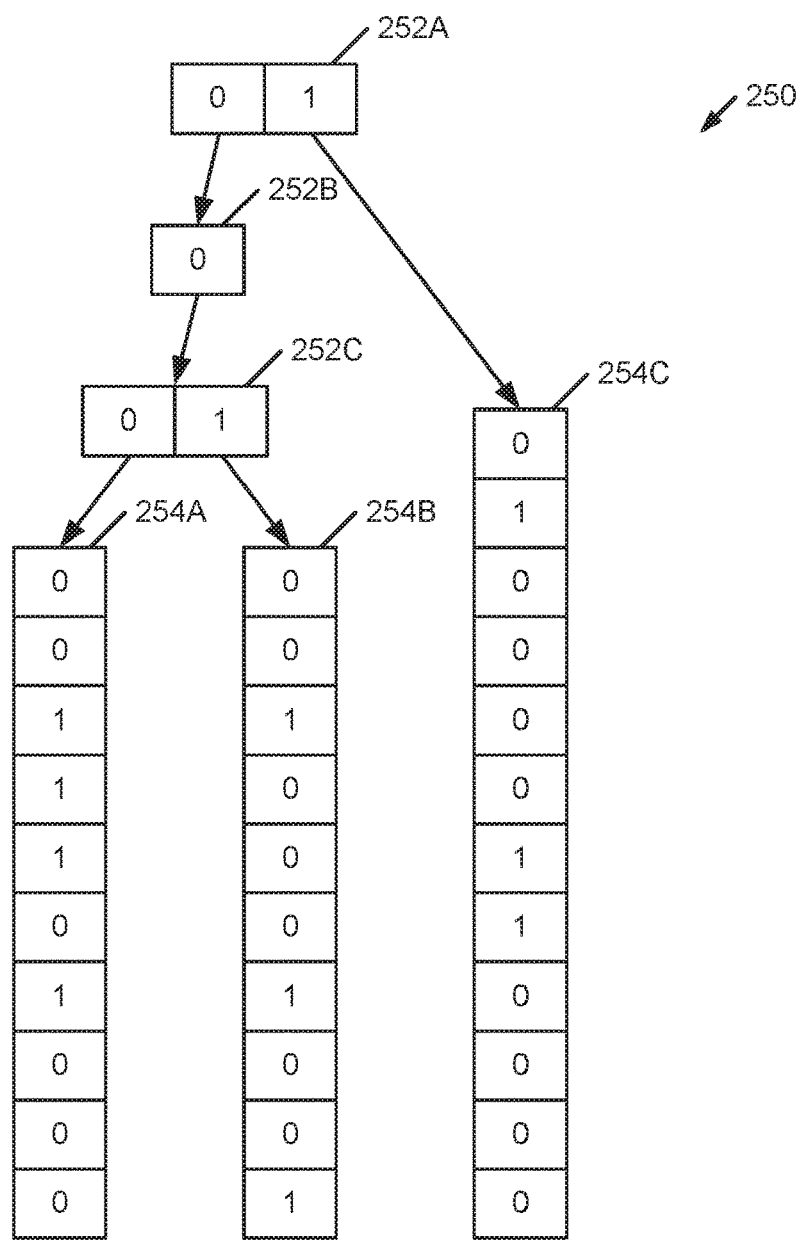

FIG. 2B shows an exemplary data representation, in accordance with one or more embodiments of the technology. The exemplary data representation shown in FIG. 2B is a binary search tree, generated from three archived document content identifiers. The first exemplary archived document content identifier is "0 0 0 0 0 1 1 1 0 1 0 0 0", the second exemplary archived document content identifier is "0 0 1 0 0 1 0 0 0 1 0 0 1", and the third exemplary archived document content identifier is "1 0 1 0 0 0 0 1 1 0 0 0 0". The exemplary binary search tree displayed in FIG. 2B is limited to three archived document content identifiers for simplicity reasons. Those skilled in the art will recognize that a binary search tree, in accordance with one or more embodiments of the technology may be generated from any number of archived document content identifiers.

The binary search tree may be organized from top to bottom, i.e. by descending through the tree, one may read the bit array entries of archived document content identifiers in the order of the bit array entries of the archived document content identifiers. Depending on what branch of the binary search tree is read, a particular archived document content identifier is obtained. Accordingly, the number of branches at the bottom of the binary search tree corresponds to the number of distinct archived document content identifiers.

A binary search tree, in accordance with an embodiment of the technology, includes key nodes and branch nodes. A key node may be a series of consecutive bits. The exemplary search tree displayed in FIG. 2B includes the key nodes 254A-254C. Key nodes may be used to represent consecutive bits of an archived document content identifier, where no more branching is encountered. Accordingly, a key node may have any length, ranging from a single bit to the entire length of an archived document content identifier (if only a single archived document identifier is stored in the binary search tree, and no branching therefore occurs).

Elements in the binary search tree where branching may occur are represented by branch nodes. A branch node may be a node that includes either a single bit (i.e., "0" or "1"), or both the bits "0" and "1". A branch node only includes a single bit if no branching occurs (e.g., branch node 252B in the exemplary binary search tree) A branch node includes both the bits "0" and "1" if branching does occur (e.g., branch nodes 252A and 252C in the exemplary binary search tree).

An additional branch is added to a binary search tree, in accordance with an embodiment of the technology, whenever an archived document content identifier is not already encoded by the binary search tree. The added branch may branch off from an existing node at the point where a first bit array entry that does not exist in the binary search tree is found. The branch-off may occur at a branch node, or it may occur at an element of a key node. At a branch node that only includes a bit "0" or the bit "1", the updated branch node includes the bit "0" and the bit "1". At a key node, key node re-encoding is performed such that any elements of the key node that are above the newly introduced branch node become branch nodes. The elements below the newly introduced branch node form new key nodes. One key node may be generated for the entries below branch node bit "0", and one key node may be generated for the elements below branch node bit "1".

Accordingly, a binary search tree, in accordance with one or more embodiments of the technology, may be used to represent the archived document content identifiers (134) in the document repository (130) of FIG. 1. With each added archived document content identifier, the binary search tree may grow.

As previously discussed, a document content identifier may be composed of relatively few term identifiers, for example, 50 term identifiers. Accordingly, the document content identifier may include 50 bit array entries that are set to "1", whereas the remaining bit array entries may be set to "0". For example, only 50 bits of the 2,147,483,648 bits of a $2^{31}$ bit identifier may be set to "1". A consecutive series of bit array entries that are set to "0" may thus be encoded in the binary search tree using a single key node that groups these bits, set to "0", rather than using a series of consecutive branch nodes that encode these bits. Accordingly, the overall number of nodes in the binary search tree is reduced, thus reducing memory requirements and improving search performance, in accordance with an embodiment of the technology.

A simplified example, illustrating the generation and the use of a binary search tree is provided as part of the use case, described below with reference to FIGS. 7A-7E.

Those skilled in the art will recognize that alternative representations may be used to encode document content identifiers. For example, document content identifiers may be encoded using a decimal, rather than a binary encoding scheme, without departing from the technology. Further, other forms of binary search trees, or even non-search-tree-like structures may be used to store archived document content identifiers. For example, the archived document content identifiers may be stored in sorted or non-sorted lists, arrays of sorted or non-sorted lists, etc.

Figure 3:
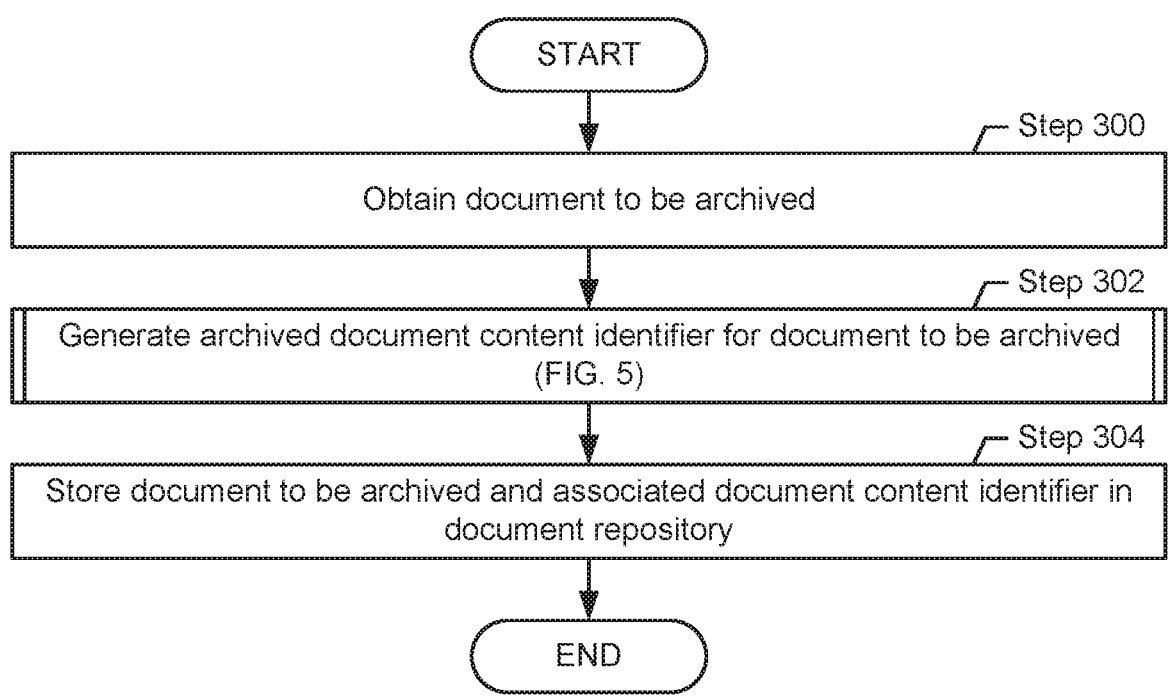
FIGS. 3-6 show flowcharts in accordance with one or more embodiments of the technology.
Figure 4:
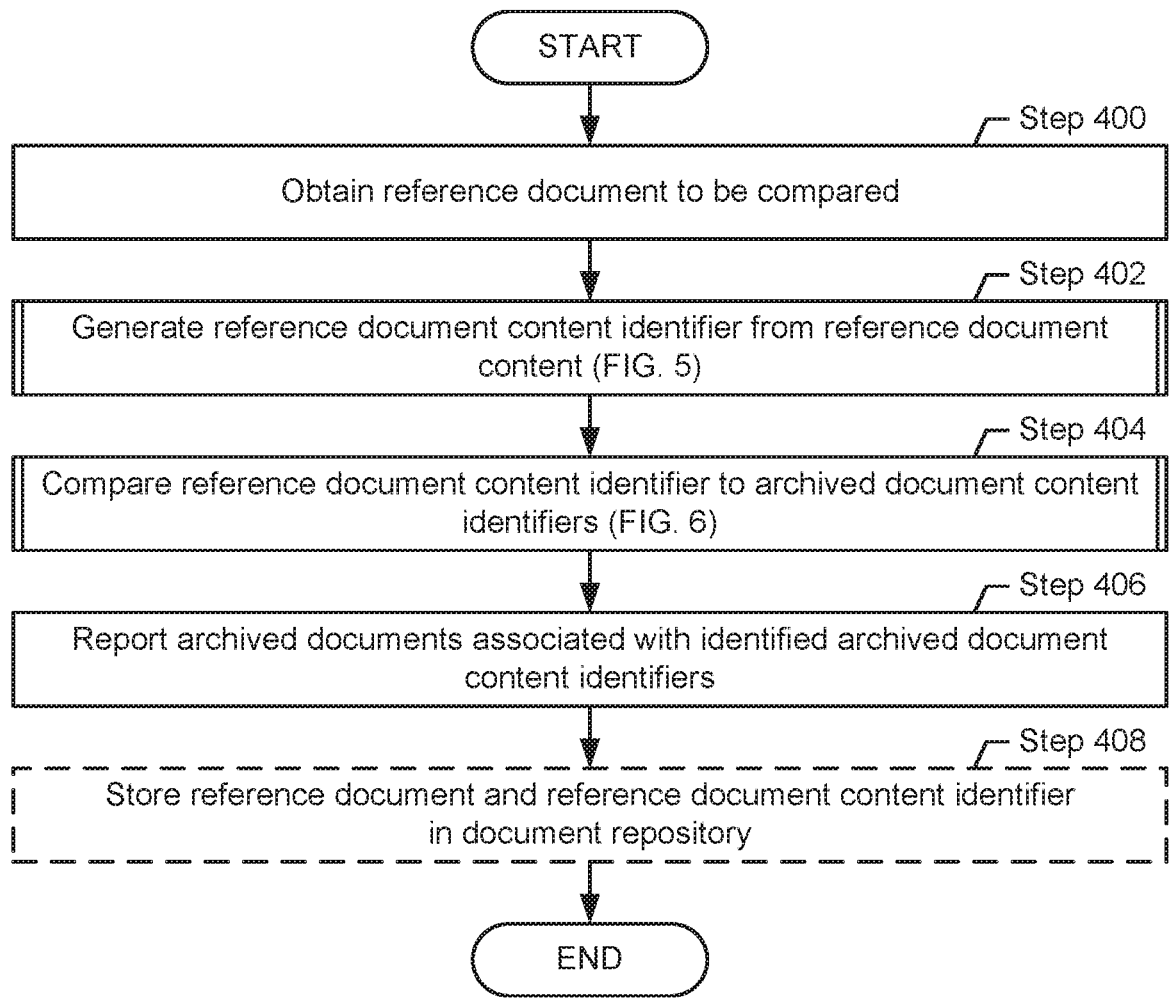
Figure 5:
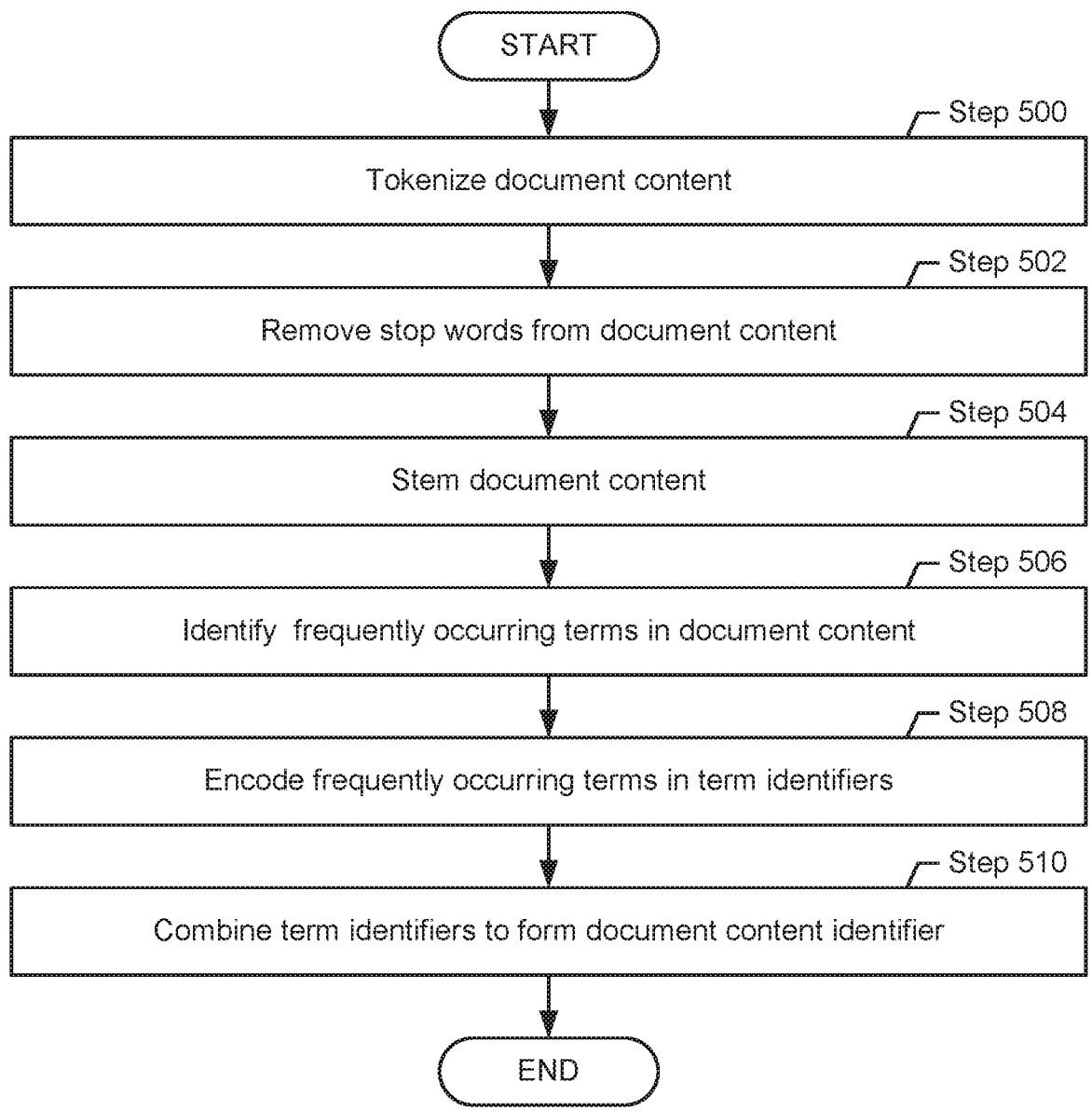
Figure 6:
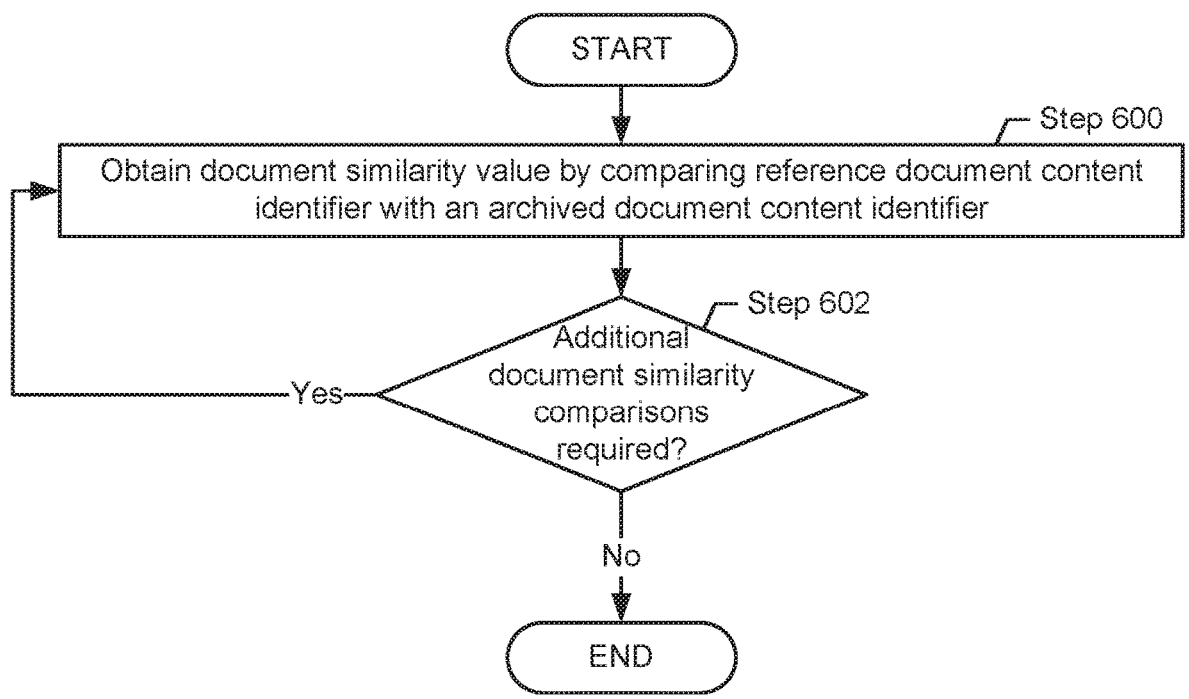

FIGS. 3-6 show methods for assessing the similarity of documents, in accordance with one or more embodiments of the technology. FIG. 3 describes the archiving of archived document content identifiers in a document repository. In one embodiment of the technology, the availability of a document repository, populated with archived document content identifiers is a prerequisite for performing a document similarity analysis, as described in FIG. 4. FIGS. 5 and 6 describe various additional aspects of the methods of FIGS. 3 and 4.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3-6 may be performed in parallel with any other steps shown in FIGS. 3-6 without departing from the technology.

FIG. 3 shows a method for archiving an archived document content identifier in a document repository. The steps shown in FIG. 3 may be executed when the document repository is established. The steps may be executed for each document that is added to the document repository. The steps may further also be executed at a later time, for example, when an additional document is added to the document repository and/or when parameters, based on which the archived document content identifiers are obtained, are updated. For example, some steps may be re-executed for archived documents if the number of frequently occurring terms to be considered in a document comparison is updated.

Turning to FIG. 3, in Step 300, the document to be archived is obtained. The document to be archived may be obtained from a user or administrator providing the document. As previously discussed, the document to be archived may be any type of document that includes text content, but that may, in addition, also include non-text content.

In Step 302, an archived document content identifier is generated for the document to be archived, from the document content. The details of Step 302 are described in FIG. 5.

In Step 304, the archived document content identifier is stored in the document repository. In one embodiment of the technology, archived document content identifiers are stored in a binary search tree, previously described with reference to FIG. 2B. The archived document content identifier, generated in Step 302, may be stored in the binary search tree by introducing a new branch to the binary search tree, as previously described, and as further illustrated in the use case example shown of FIGS. 7A-7E. Further, the document to be archived may also be stored in the document repository.

FIG. 4 shows a method for comparing the content of a reference document to the content of archived documents. The comparison, in accordance with an embodiment of the technology, is performed by identifying similarities between a reference document content identifier associated with the reference document and the archived document content identifiers associated with the archived documents. The steps shown in FIG. 4 may be executed for each reference document for which a similarity analysis is requested, e.g., by a user providing the reference document.

Turning to FIG. 4, in Step 400, the reference document to be compared is obtained. The reference document may be obtained from a user that provides the document. Alternatively, the reference document may be obtained from a document repository, based on instructions provided by the user. The reference document may be of any file format including, for example, plain text (.txt), Microsoft® Word (.doc, .docx), Adobe® Acrobat (.pdf), etc. Those skilled in the art will appreciate that the technology is not limited to the aforementioned protocols. Rather, any file that may contain text, either exclusively, or in combination with non-text content (e.g. CAD files), regardless of the file format, may be processed.

In Step 402, a reference document content identifier is generated for the reference document to be compared, from the document content. The details of Step 402 are described in FIG. 5.

In Step 404, a comparison between the reference document content identifier and archived document content identifiers is performed to assess similarity of the reference document content with content in the archived documents. The details of Step 404 are described in FIG. 6.

In Step 406, the archived documents, associated with the archived document content identifiers identified in Step 404, are reported. The documents may be reported to a user, for example, by providing the file names of the documents, and/or by displaying the documents. Further, the degree of similarity may be reported for each archived document being reported.

In Step 408, the reference document content identifier may optionally be stored in the document repository to be included in future similarity analyses. In one embodiment of the technology, archived document content identifiers are stored in a binary search tree, previously described with reference to FIG. 2B. The reference document content identifier, generated in Step 402, may be stored in the binary search tree by introducing a new branch to the binary search tree, as previously described, and as further illustrated in the use case example shown of FIGS. 7A-7E. Further, the reference document may also be stored in the document repository.

FIG. 5 shows a method for generating a document content identifier from document content. If the document is a reference document, the method described in FIG. 5 may generate a reference document content identifier. If the document is a document to be archived, the method described in FIG. 5 may generate an archived document content identifier. The method described in FIG. 5 may further be applied to archived documents for which archived document content identifiers have already been generated. This may be the case, for example, if parameters, further discussed below, are updated, thus resulting in archived document content identifiers different from the existing archived document content identifiers. The steps shown in FIG. 5 may be executed separately for each document content identifier to be generated, regardless of whether the document content identifier is a reference document content identifier or an archived document content identifier.

In Step 500, the document content is tokenized, i.e., the text is segmented into linguistic units such as words, punctuation, numbers, alpha-numerics, etc. The tokenization may be performed by an algorithm that separates words based on the detection of "space" characters. Alternatively, or additionally, the tokenization may include linguistically motivated considerations and may include extensions for handling abbreviations, hyphenation, numerical expressions, field-specific vocabulary, and/or for detecting names. In one embodiment of the technology, the tokenization algorithm is language specific. In addition, the tokenization algorithm may be capable of handling spelling errors and unexpected characters.

In Step 502, stop words are removed from the document content. Stop words may be frequently occurring words such as, for example "the", "a" "to", etc. that may not serve as meaningful keywords for representing the document content in a document content identifier. A stop word list may be used to specify stop words. Words that are included in the stop word list may be removed from the document content.

In Step 504, the document content is stemmed, i.e., the tokenized words of the document content are replaced by the corresponding word stems. For example, the words "fishing", fished" and "fisher" may be reduced to the root word fish. Alternatively, lemmatization may be used to obtain the word stems.

In Step 506, frequently occurring terms are identified in the document content. Frequently occurring terms may be obtained, for example, by generating a sorted list of the word stems. The list may be sorted based on the frequency of occurrence of the word stems. For example, the 25 or 100 word stems with the highest frequency of occurrence may be chosen for further processing. In one embodiment of the technology, the number of frequently occurring terms may be configurable.

In Step 508, the frequently occurring terms, obtained in Step 506, are encoded in term identifiers. One term identifier may be generated for each frequently occurring term. In one embodiment of the technology, a thesaurus is used to standardize the frequently occurring terms, prior to generating term identifiers for the frequently occurring terms. This standardization may ensure that the same term identifiers are generated for frequently used terms with the same meaning. As previously described with reference to FIG. 2A, a frequently occurring term may be encoded such that it is represented by a number, for example in a range between 0 and $2^{31}$. Various methods for mapping a frequently occurring term to a number exist.

In one embodiment of the technology, the mapping is performed in a two-step process. In a first step, a hash function is applied to the frequently occurring term. While the input of the hash function, i.e., the frequently occurring term, may have a variable length (e.g. a short word vs. a long word), the output of the hash function may have a fixed length. Consider, for example, the use of an MD5 hash algorithm. The hash algorithm accepts a frequently occurring term of an arbitrary length and generates a 16-byte hash value that is specific to the frequently occurring term. Those skilled in the art will recognize that other hash algorithms may be used instead of the MD5 algorithm. For example, and SHA-1 or SHA-256 algorithm may be used instead. Further, the algorithm used in the first step may not necessarily be a hash algorithm. Any algorithm suitable for deterministically generating an output of a specified length from an input of arbitrary length may be used instead.

In a second step, a modulo operation may be performed to obtain the term identifier within a desired numerical range. For example, a mod $2^{31}$ operation may be performed on the output of the hash algorithm to obtain a term identifier that fits within the numerical range from 0 to $2^{31}-1$. Above-described first and second steps may be performed separately for each frequently occurring term, resulting in a term identifier for each frequently occurring term.

In one embodiment of the technology, the term identifiers may be stored in a file, e.g., in a text file, along with the file name of the document for which the term identifiers were generated. The file, used for storage of the term identifiers and the corresponding document file name, may include the term identifiers and corresponding document file names for all reference documents, thus enabling building and re-building the binary search tree from the document content identifiers derived from the term identifiers, without having to repeat the steps performed for generating the term identifiers, for example, after a restart of the system.

In Step 510, the term identifiers obtained in Step 508 are combined to form the document content identifier, as previously described with reference to FIG. 2A.

FIG. 6 shows a method for comparing a reference document content identifier to a set of archived document content identifiers. The method may be executed to obtain quantitative measures for the similarity of the reference document content identifier and the archived document content identifiers. One document similarity value may be obtained for each pair consisting of the reference document content identifier and an archived document content identifier. Accordingly, if there are, for example, 1,000 archived document content identifiers, up to 1,000 document similarity values may be generated. A similarity value, obtained from the reference document content identifier and an archived document content identifier, in accordance with an embodiment of the technology, indicates the degree of similarity between the corresponding reference and archived documents.

In Step 600, a document similarity value is obtained by comparing the reference document content identifier with an archived document content identifier. In one embodiment of the technology, the archived document content identifiers are stored in a binary search tree, as previously described with reference to FIG. 2B. In this case, the similarity value is obtained as follows.

The binary search tree nodes (including branch nodes and key nodes) where there is zero-bit discrepancy (all bits matching) between the bit array entries of the reference document content identifier and the corresponding entries in the nodes of the binary search tree are traversed. The traversed nodes are marked with the number of deviating bits that were found. Both branches of a branch node may be marked with the number of deviating bits, regardless of which one of the branches originating from the branch node is chosen. In one embodiment of the technology, the address of the branch originating from the branch node where the number of deviating bits is higher is stored, e.g., in a linked list that is ordered by the number of deviating bits. The linked list may be referred to during the next execution of Step 600, in order to identify the branch with the next-lowest number of deviating bits. When the key node that terminates the branch with zero deviating bits is reached, the total number of deviating bits (including key node bits) is counted. Note that no node with zero deviating bits may exist. In this case, execution of Step 600 may not result in the reaching of a key node.

Step 600 and subsequent repetitions of Step 600 are further illustrated in the used case described below with reference to FIGS. 7A-7E.

In one embodiment of the technology, the total number of deviating bits is an indicator for the degree of difference between the reference document content and the archived document content, corresponding to archived document content identifier reached in the binary search tree. A larger number of deviating bits may thus indicate reduced similarity of reference and archived document content. A document similarity value may be derived from the number of deviating bits, for example, by calculating the inverse of the number of deviating bits, or by subtracting the number of deviating bits from the total number of bits used in the reference and archived document content identifiers, etc.

In Step 602, a determination is made about whether additional document similarity comparisons are required. Additional document similarity comparisons may be required, for example, if the user that initiated the comparison requested the detection of multiple archived documents, and/or if the document found in the first iteration does not have reach a minimum similarity, specified, for example, by the user.

If a determination is made that additional document similarity comparisons are required, the method may return to Step 600 in order to obtain an additional document similarity value for a different archived document content identifier. In this second iteration, the binary search tree nodes (including branch nodes and key nodes) where there is a one-bit discrepancy between the bit array entries of the reference document content identifier and the corresponding entries in the nodes of the binary search tree are traversed to reach another key node, thus obtaining a document similarity value for the archived document identifier corresponding to the branch terminating in the key node that has been reached.

In additional iterations, the above Step 600 may be repeated for two-bit, three-bit, four-bit, etc. discrepancies, until it is determined, in Step 602, that no more document similarity comparisons are required.

If a determination is made in Step 602 that no more additional document similarity comparisons are required, the execution of the method may terminate.

Those skilled in the art will recognize that details of the method for comparing a reference document content identifier to a set of archived document content identifiers may vary, depending on how the document repository is organized, without departing from the technology.

FIGS. 7A-7E show exemplary data representations, in accordance with one or more embodiments of the technology. The subsequently described use case scenario is based on these exemplary data representations. The use case scenario is intended to provide an example of the method for document similarity analysis, described in FIGS. 3-6. The use case scenario is based on the exemplary data representations shown in FIGS. 7A-7E and is for illustrative purposes only. The methods described by FIGS. 3-6 are not limited to the data representations shown in FIGS. 7A-7E.

Figure 7A:
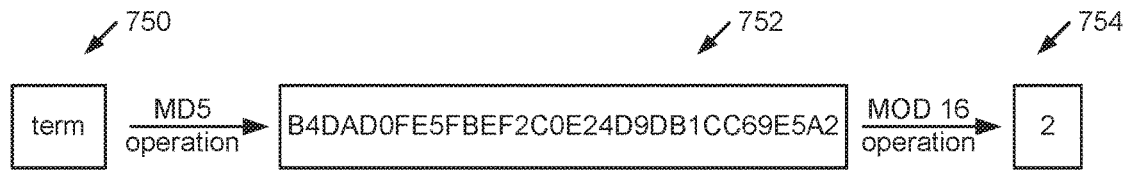
FIGS. 7A-7E show data representations, in accordance with one or more embodiments of the technology.

Consider a scenario in which a set of four frequently occurring terms has been obtained in Step 506 of FIG. 5. One of the identified frequently occurring terms is the word "term". FIG. 7A shows how the frequently occurring term "term" (750) is first converted to a hash value (752) by applying an MD5 hash algorithm. Subsequently, the hash value (752) is converted to the term identifier "2" (754) within the range from 0 to 15, using the MOD 16 operation (Step 508). In addition, the four remaining frequently occurring terms "tuesday", "november", "lucene" and "posting" are converted to the term identifiers "0", "15", "6" and "7", respectively.

Figure 7B:
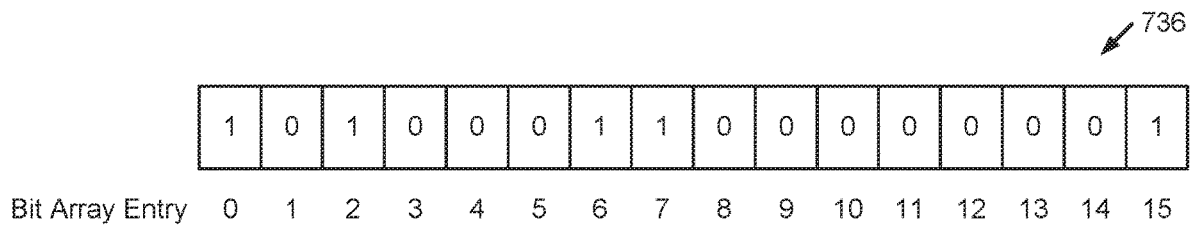

As shown in FIG. 7B, the five term identifiers are inserted into the reference document content identifier (736) (Step 510). The reference document content identifier (736) includes 16-bit array entries ranging from 0 to 15.

Figure 7C:
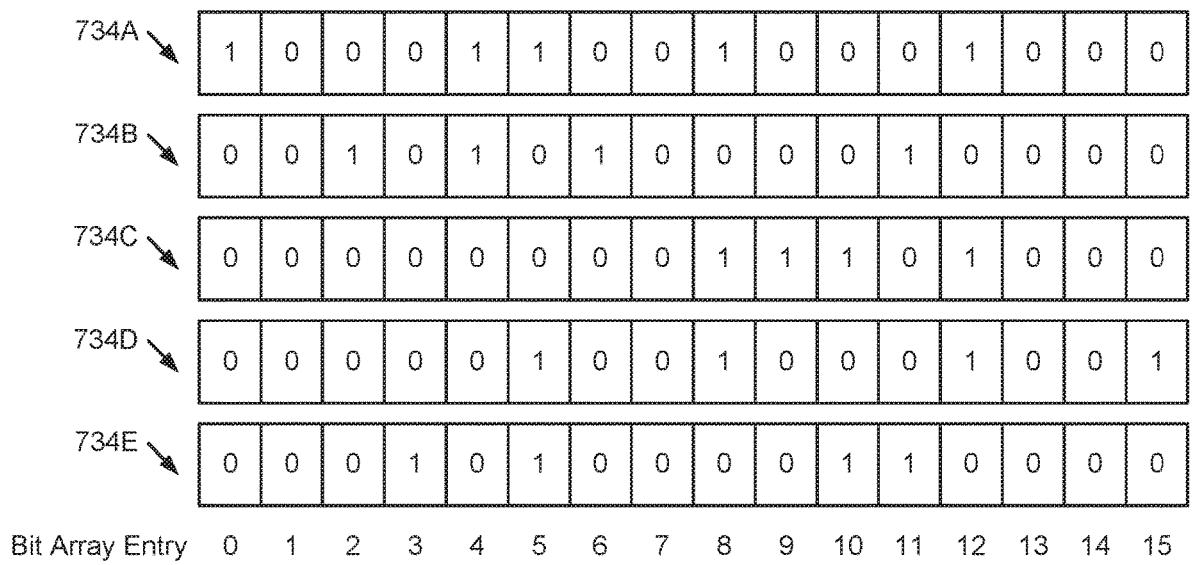
Figure 7D:
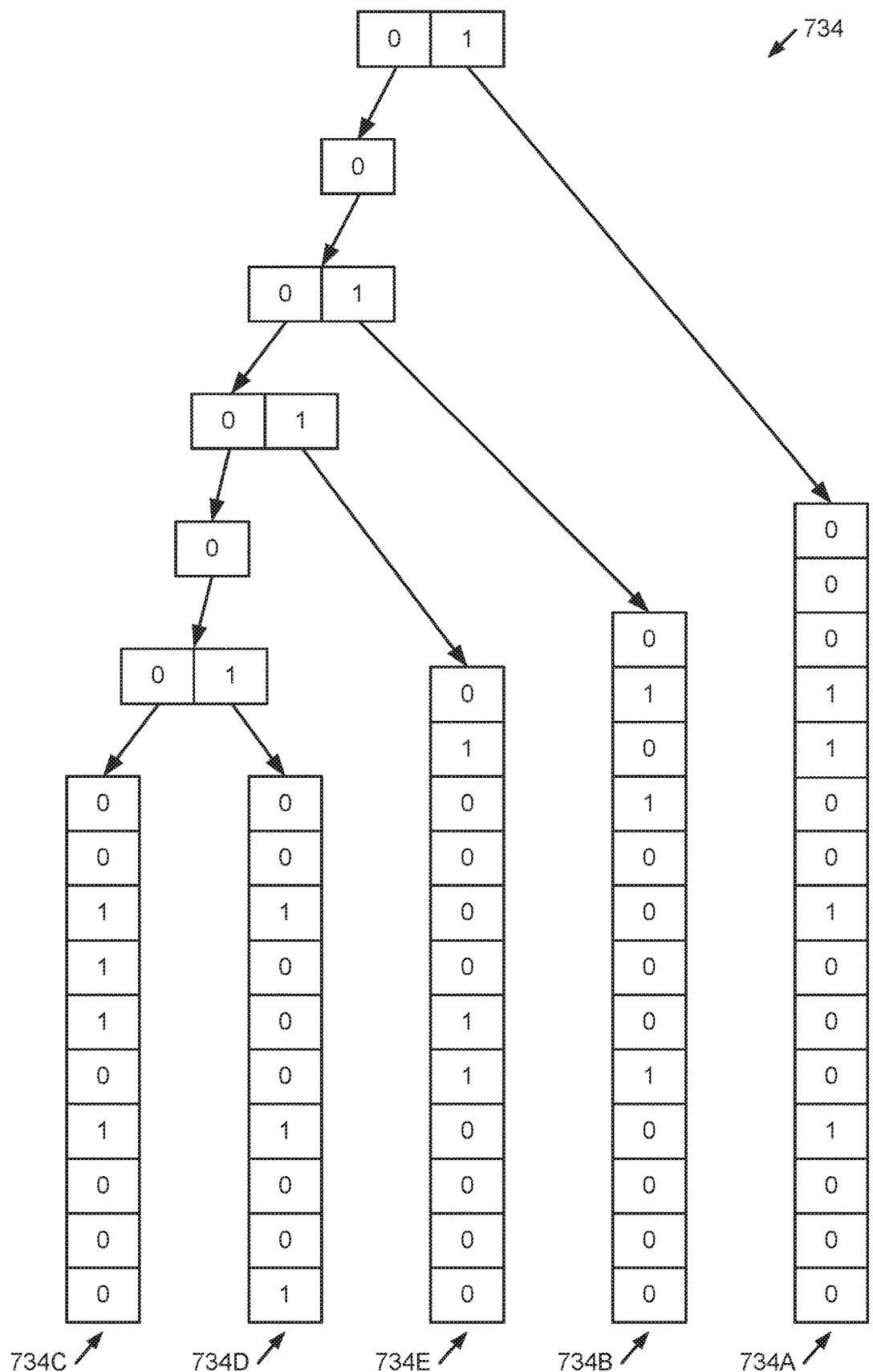

FIG. 7C shows archived document content identifiers (734A-734E) obtained from the content of five archived documents. Analogous to the reference document content identifier (736), each of the archived document content identifiers include 16-bit array entries ranging from 0 to 15. In FIG. 7D, the archived document content identifiers (734A-734E) are organized in a binary search tree (734).

Figure 7E:
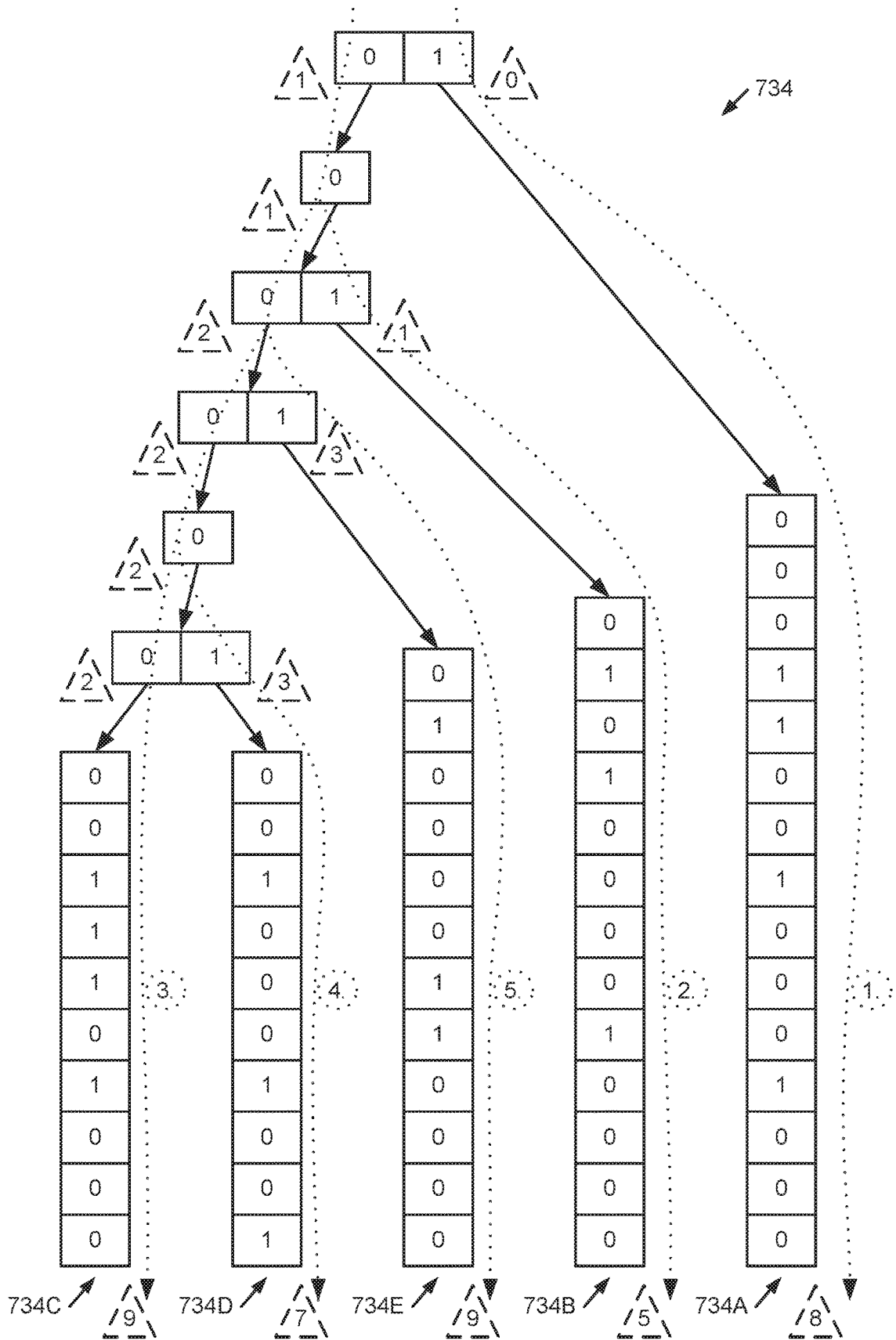

FIG. 7E illustrates how the method described in FIG. 6 is executed to compare the reference document content identifier (736) to the archived document content identifiers (734A-734E) stored in the binary search tree (734). To illustrate the navigation through the search tree, a set of dotted arrows that show the pathway to each of the archived document content identifiers is added. Each of the arrows is labeled with a number surrounded by a dotted circle. These numbers indicate in which order the archived document content identifiers are accessed when the comparison to the reference document content identifier (736) is performed. Further, each node is labeled with one or two numbers surrounded by a dashed triangle. These numbers indicate the number of deviating bits observed when following branches through a particular node. The numbers that indicate deviating bits are cumulative, i.e. a number further down a branch includes deviating bits observed at nodes traversed toward the current node.

When performing the comparison, as previously described, first, the nodes with zero bit discrepancy are traversed. In the use case, the right branch of the topmost node is therefore chosen. The address of the left branch of the topmost node is stored in the linked list as an entry for a single-bit discrepancy. The branch leads directly to the key node for archived document content identifier (734A). A total of eight bits are deviating. Next, the nodes with singe bit discrepancy, as documented in the linked list, are traversed, leading to the key node for archived document content identifier (734B). Branches of nodes traversed where a two-bit discrepancy is encountered are documented in the linked list as entries for two-bit discrepancies. A total of five bits are deviating. Then, the nodes with two bit discrepancy, as documented in the linked list, are traversed, leading to the key node for archived document content identifier (734C). Branches of nodes traversed where a three-bit discrepancy is encountered are documented in the linked list as entries for three-bit discrepancies. A total of nine bits are deviating. Subsequently, the nodes with three bit discrepancy, as documented in the linked list, are traversed, leading to the key nodes for archived document content identifiers (734D and 734E). A total of seven and nine bits are deviating, respectively.

Accordingly, it is found that archived document content identifier (734B) is most similar to the reference document content identifier (736).

As the use case illustrates, only relatively few nodes of the binary search tree may need to be traversed in order to locate an archived document content identifier with a high degree of similarity to the reference document content identifier. If no archived document content identifiers with sufficient similarity exist in the binary search tree, this may be rapidly detected. After traversing a sufficient number of branch nodes, it may be concluded that a qualifying archived document content identifier does not exist, without traversing the remaining nodes.

Embodiments of the technology may enable a system to detect content similarities in documents. Similarity of a reference document with one or more archived documents is assessed based on reference and archived document content identifiers, in accordance with one or more embodiments of the technology. In one embodiment of the technology, the archived document content identifiers are forming a binary search tree, enabling efficient comparison of a reference document content identifier with one or more archived document content identifier in the binary search tree. Archived document content identifiers with a high degree of similarity to the reference document identifier may be rapidly located. The content similarity analysis performed by the system may be faster and/or more cost effective than a similar analysis performed by a human expert. The content similarity analysis may therefore be particularly beneficial in scenarios where a similarity analysis performed by a human expert is impractical, inefficient or even impossible.

The document content similarity analysis, in accordance with one embodiment of the technology may be provided as a service. A user of the service may, for example, upload a reference document and one or more documents to be analyzed for content similarities, and may then receive the result of the similarity analysis from the service.

Embodiments of the technology may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

The invention claimed is:

1. A method for document similarity analysis, the method comprising:
receiving, by a processor, a selection of a reference document specified by a user via a user interface;
converting, by the processor, the selected reference document into a reference document content identifier from content of the selected reference document, the converting further comprising:
tokenizing the content of the selected reference document;
identifying a plurality of frequently occurring terms in the tokenized content of the reference document;
for each of the identified frequently occurring terms, encoding the respective identified frequently occurring term by mapping the respective identified frequently occurring term to a number; and
generating the reference document content identifier based on the encoded plurality of frequently occurring terms by combining the encoded plurality of frequently occurring terms into a bit array representation populated with the encoded plurality of frequently occurring terms, the bit array representation having bits each representing a particular one of the identified frequently occurring terms and set at locations each representing a particular one of the identified frequently occurring terms and the identified frequently occurring terms is contained in the reference document;
comparing the reference document content identifier with a plurality of archived document content identifiers, each associated with one of a plurality of archived documents stored in a document repository;
generating a plurality of document similarity values based on comparisons of the reference document content identifier with the plurality of archived document content identifiers; and
returning, by the processor, a document list for presentation on the user interface, the document list listing a set of documents identified from the plurality of archived documents based on the plurality of document similarity values.

2. The method of claim 1, wherein encoding the identified frequently occurring terms includes applying a hash function to each of the identified frequently occurring terms.

3. The method of claim 2, wherein encoding the identified frequently occurring terms further comprises applying a modulo operation on each of the hashed values to generate a term identifier for each of the identified frequently occurring terms.

4. The method of claim 1, wherein encoding the identified frequently occurring terms includes applying an algorithm to each of the identified frequently occurring terms to generate outputs having a specified length.

5. The method of claim 1, wherein converting the selected reference document into a reference document content identifier further comprises, prior to identifying the frequently occurring terms in the content of the reference document:
- removing stop words from the content of the reference document; and
- stemming the content of the reference document.

6. The method of claim 1, wherein the plurality of archived document content identifiers are each organized in a binary search tree.

7. The method of claim 6, wherein generating the plurality of document similarity values further comprises traversing the respective binary search trees to identify an archived document content identifier with a highest similarity to the reference document content identifier.

8. A system for document similarity analysis, comprising:
- a computing device comprising a computer processor;
- a document content identifier encoding engine, executable on the computer processor to:
  - receive, by a processor, a selection of a reference document specified by a user via a user interface;
  - convert, by the processor, the selected reference document into a reference document content identifier from content of the selected reference document, the converting further comprising:
    - tokenize the content of the selected reference document;
    - identify a plurality of frequently occurring terms in the tokenized content of the reference document;
    - for each of the identified frequently occurring terms, encode the respective identified frequently occurring term by mapping the respective identified frequently occurring term to a number; and
    - generate the reference document content identifier based on the encoded plurality of frequently occurring terms by combining the encoded plurality of frequently occurring terms into a bit array representation populated with the encoded plurality of frequently occurring terms, the bit array representation having bits each representing a particular one of the identified frequently occurring terms and set at locations each representing a particular one of the identified frequently occurring terms and the identified frequently occurring terms is contained in the reference document;
  - compare the reference document content identifier with a plurality of archived document content identifiers, each associated with one of a plurality of archived documents stored in a document repository;
  - generate a plurality of document similarity values based on comparisons of the reference document content identifier with the plurality of archived document content identifiers; and
  - return, by the processor, a document list for presentation on the user interface, the document list listing a set of documents identified from the plurality of archived documents based on the plurality of document similarity values.

9. The system of claim 8, wherein encoding the identified frequently occurring terms includes applying a hash function to each of the identified frequently occurring terms.

10. The system of claim 9, wherein encoding the identified frequently occurring terms further comprises applying a modulo operation on each of the hashed values to generate a term identifier for each of the identified frequently occurring terms.

11. The system of claim 8, wherein encoding the identified frequently occurring terms includes applying an algorithm to each of the identified frequently occurring terms to generate outputs having a specified length.

12. The system of claim 8, wherein converting the selected reference document into a reference document content identifier further comprises, prior to identifying the frequently occurring terms in the content of the reference document:
- removing stop words from the content of the reference document; and
- stemming the content of the reference document.

13. The system of claim 8, wherein the plurality of archived document content identifiers is each organized in a binary search tree.

14. The system of claim 13, wherein generating the plurality of document similarity values further comprises traversing the respective binary search trees to identify an archived document content identifier with a highest similarity to the reference document content identifier.

15. A non-transitory computer readable medium storing computer-readable instructions for document similarity analysis, the computer-readable instructions executable to:
- receive, by a processor, a selection of a reference document specified by a user via a user interface;
- convert, by the processor, the selected reference document into a reference document content identifier from content of the selected reference document, the converting further comprising:
  - tokenize the content of the selected reference document;
  - identify a plurality of frequently occurring terms in the tokenized content of the reference document;
  - for each of the identified frequently occurring terms, encode the respective identified frequently occurring term by mapping the respective identified frequently occurring term to a number; and
  - generate the reference document content identifier based on the encoded plurality of frequently occurring terms by combining the encoded plurality of frequently occurring terms into a bit array representation populated with the encoded plurality of frequently occurring terms, the bit array representation having bits each representing a particular one of the identified frequently occurring terms and set at locations each representing a particular one of the identified frequently occurring terms and the identified frequently occurring terms is contained in the reference document;
- compare the reference document content identifier with a plurality of archived document content identifiers, each associated with one of a plurality of archived documents stored in a document repository;
- generate a plurality of document similarity values based on comparisons of the reference document content identifier with the plurality of archived document content identifiers; and
- return, by the processor, a document list for presentation on the user interface, the document list listing a set of documents identified from the plurality of archived documents based on the plurality of document similarity values.

16. The non-transitory computer readable medium of claim 15, wherein encoding the identified frequently occurring terms includes applying a hash function to each of the identified frequently occurring terms.

17. The non-transitory computer readable medium of claim 15, wherein converting the selected reference document into a reference document content identifier further comprises, prior to identifying the frequently occurring terms in the content of the reference document:

removing stop words from the content of the reference document; and stemming the content of the reference document.

18. The non-transitory computer readable medium of claim 15, wherein the plurality of archived document content identifiers is each organized in a binary search tree.

19. The non-transitory computer readable medium of claim 18, wherein generating the plurality of document similarity values further comprises traversing the respective binary search trees to identify an archived document content identifier with a highest similarity to the reference document content identifier.

* * * * *